E. KATZINGER.
PROCESS FOR FORMING WELDING PROTUBERANCES ON SHEET METAL, &c.
APPLICATION FILED MAY 9, 1910.
1,005,980.
Patented Oct. 17, 1911.
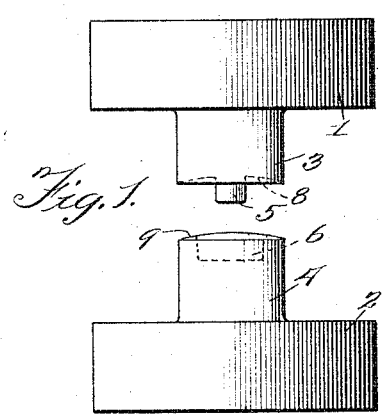
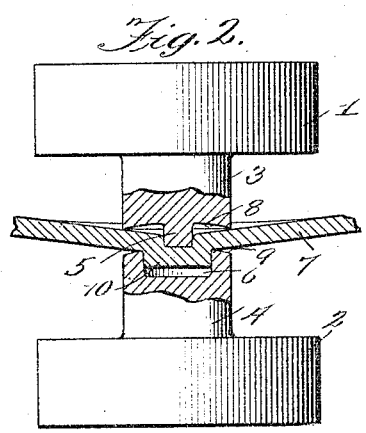
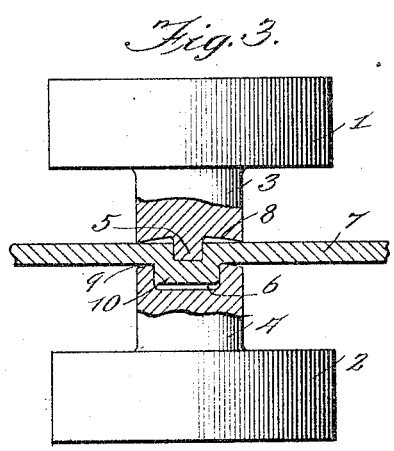
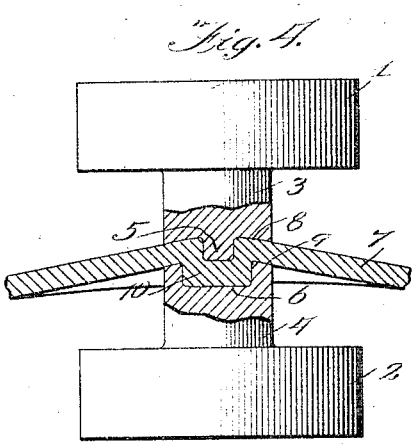
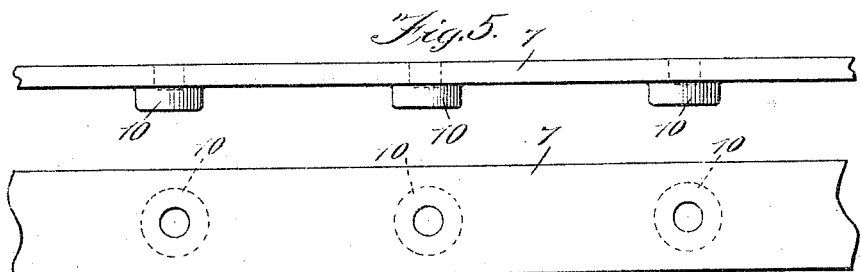
Witnesses:
Inventor:
Edward Katzinger

UNITED STATES PATENT OFFICE.

EDWARD KATZINGER, OF CHICAGO, ILLINOIS.

PROCESS FOR FORMING WELDING PROTUBERANCES ON SHEET METAL, &c.

1,005,980.   Specification of Letters Patent.   Patented Oct. 17, 1911.

Application filed May 9, 1910. Serial No. 560,102.

*To all whom it may concern:*

Be it known that I, EDWARD KATZINGER, a citizen of the United States, residing at Chicago, in the county of Cook and State of Illinois, have invented certain new and useful Improvements in Processes for Forming Welding Protuberances on Sheet Metal and the Like.

This invention relates to a process for preparing metals for being united by spot welding, and has for its primary object to provide an improved process whereby when a strap or piece of sheet metal is stamped to provide welding protuberances thereon, said strap or sheet will by said dies be left in a perfectly flat condition.

Other and further objects will appear in the specification and be more specifically pointed out in the appended claims, reference being had to the accompanying drawing, which illustrates the several steps of the process.

In the drawings—Figure 1 is a view in elevation of coöperating dies by means of which the strap or sheet metal is provided with welding protuberances. Fig. 2 is a similar view illustrating the first stage of the process in preparing a strip of metal for spot welding, parts being shown in section. Fig. 3 is a view similar to Fig. 2, illustrating a further stage of the process. Fig. 4 is a view similar to Figs. 2 and 3, showing the dies at the end of the stamping operation. Fig. 5 is a side elevation of the strap provided with a plurality of welding protuberances in the manner indicated in Figs. 2, 3 and 4. Fig. 6 is a top plan view of the strap shown in Fig. 5.

According to present well known methods of spot welding, one of the sheets may be provided with one or more protuberances which are pressed against the other sheet while a welding current is being passed therethrough. These protuberances can be most easily and rapidly formed between stamping dies but according to present well known methods the strip or sheet is bowed radially in all directions around each protuberance so that the sheet has imparted thereto a plurality of cup-shaped hollows. Moreover when a strap or bar is thus stamped, the bends in said bar corresponding to the locations of said hollows, cause the bar to assume an arcuate form. In consequence of these drawbacks, it becomes necessary to hammer the sheet or strap out flat before the welding takes place, an operation which consumes considerable time and effort. To provide stamping-dies of improved construction and conformation whereby the hand straightening or flattening operation is rendered unnecessary, constitutes the primary object of this invention. By means of the construction and arrangement of parts in the present device, however, a further beneficial result accrues in that the oxid scales which are usually found on the metals to be welded are removed during the stamping operation thus rendering unnecessary the usual pickling bath with its attendant expense and inconvenience.

In pursuance of the objects and purposes of the present invention, means are provided for cupping the metal oppositely to the cupping which occurs during the formation of the protuberance. For this purpose, stamping dies 1 and 2 are made use of, the contiguously disposed ends of the shank portions 3 and 4 of which are provided respectively with a protuberance 5 and recess 6 so proportioned and arranged as to form a protuberance 10 on the metal to be stamped, when the dies are moved together.

In Fig. 2, is shown the form assumed by the strap or bar 7 during the first stage of the operation in which the protuberance 10 is approximately completely formed and the bar on either side deflected upwardly into a position corresponding to that assumed by a bar after it has been operated upon by present well known types of stamping dies. The distinguishing features of the device forming the subject matter of the present invention reside in and are connected with the provision at the end of the male die of a cupped hollow 8 having a curvature corresponding to the convex end 9 of the female die. In Fig. 3 is shown the relative positions of dies 1 and 2 corresponding to the final positions of dies commonly used. Should the bar 7 be removed at this stage of the operation, it would assume a position approximately that shown in Fig. 2. The stamping operation being continued, however until the parts assume the positions shown in Fig. 4, the bar 7 upon being removed from between the dies 1 and 2 assumes the straight flat position shown in Fig. 5, inasmuch as the degree of curvature imparted to the end faces of the dies 1 and 2 is just sufficient to overcome the cupping which takes place during the first part of the process.

In Fig. 5 is indicated the final position assumed by the bar 7 after it has been provided with a plurality of protuberances 10. As the process is carried out and the bar 7 passes by successive stages from the position shown in Fig. 2 to that shown in Fig. 4, a complete rearrangement of the surface molecules takes place with the result that the scales usually found on the surface of the bar, are entirely removed thus insuring a clean welding surface.

What I claim is:

1. The process of preparing a sheet for welding which consists in stamping said sheet to provide a welding protuberance thereon, and impressing the metal of said sheet out of its plane on the side of said protuberance to prevent said sheet from being cupped on the side opposite said protuberance, and finally in removing the pressure to permit the sheet to flatten into a plane.

2. The process of stamping a metal strap to form welding protuberances thereon which consists in stamping the protuberances on the strap during which operation said strap is cupped about each protuberance with said protuberance on the convex side, in supporting the metal of said strap immediately contiguous to each protuberance, in pressing other portions of the metal surrounding the supported portions into cups with said protuberances on the concave side, and finally in removing the pressure to permit the strap to straighten under the resiliency of the metal.

3. The process of preparing sheet metal for welding which consists in stamping said sheet to form a welding protuberance thereon during which operation the sheet is cupped in one direction with said protuberance on the convex side, in flattening said sheet with the exception of said protuberance, and finally in cupping the sheet sufficiently in the opposite direction with said protuberance on the concave side to cause all the sheet except said protuberance to lie in the same plane.

4. The process of forming protuberances in sheet metal for welding which consists in stamping said sheet to provide a welding projection, in cupping the metal convexly with respect to the projection, in continuing the stamping pressure in the same direction to cup the metal in the reverse direction an amount sufficient to overcome the first cupping action whereby when pressure is removed the metal sheet will assume a flat or plain condition.

5. The process of forming projections in sheet metal for spot welding which consists in stamping said sheet to form a protuberance and cupping the metal convexly on the side of the protuberance, in continuing the stamping pressure in the same direction and cupping the metal concavely on the side of the protuberance so that when the stamping pressure is removed the metal sheet will lie flat and the protuberance will project therefrom.

In testimony whereof I have signed my name to this specification, in the presence of two subscribing witnesses, on this 2nd day of May A. D. 1910.

EDWARD KATZINGER.

Witnesses:
M. W. CANTWELL,
A. O. KNIGHT.